United States Patent [19]

Nelson

[11] Patent Number: 4,897,456
[45] Date of Patent: Jan. 30, 1990

[54] RATE MODERATED TWO COMPONENT METATHESIS CATALYST SYSTEM

[75] Inventor: Lawrence L. Nelson, Wilmington, Del.

[73] Assignee: Hercules Incorporated, Wilmington, Del.

[21] Appl. No.: 296,991

[22] Filed: Jan. 13, 1989

Related U.S. Application Data

[62] Division of Ser. No. 53,429, May 18, 1987, Pat. No. 4,826,942.

[51] Int. Cl.$^4$ ............................ C08F 4/24; C08F 4/22
[52] U.S. Cl. ..................................... 526/141; 526/136; 526/142; 526/169; 526/188; 526/281; 526/282; 526/283; 502/117
[58] Field of Search ............... 526/283, 141, 169, 136, 526/142, 188, 281, 282; 502/117, 124, 125, 126

[56] References Cited

U.S. PATENT DOCUMENTS 4,080,491  3/1978  Kobayashi et al. ............. 526/281 X

OTHER PUBLICATIONS

The Merck Index, M. Windholz et al. (ed.) 644 (1976).
Chelating Agents and Metal Chelates, Dwyer et al (ed.) Academic Press, N.Y., 100–101, 118–119 (1964).

*Primary Examiner*—Joseph L. Schofer
*Assistant Examiner*—F. M. Teskin
*Attorney, Agent, or Firm*—Mark Goldberg

[57] ABSTRACT

Disclosed is a method of reducing the activation rate of an alkyl aluminum activator in the metathesis polymerization of polycyclic cycloolefins. Activation rate is reduced by use of a bidentate Lewis base as the reaction rate moderator.

15 Claims, No Drawings

RATE MODERATED TWO COMPONENT METATHESIS CATALYST SYSTEM

This application is a division, of application Ser. No.053,429, filed May 18,1987, now U.S. Pat. Ser. No. 4,826,942.

This invention relates to the polymerization of strained ring polycyclic cycloolefins under the influence of an aluminum alkyl-activated-metathesis catalyst system. In particular, it relates to an aluminum alkyl activator whose activation rate is significantly slower than that of presently used activator systems.

Preparation of thermoset cycloolefin polymers via metathesis catalysts is a relatively recent development in the polymer art. Klosiewicz in U.S. Pat. Ser. No. 4,400,340 and U.S. Pat. Ser. No.4,520,181 teaches preparation of such polymers from dicyclopentadiene and other similar strained ring polycyclic cycloolefins via a two-stream reaction injection molding technique wherein a first stream, including the catalyst, and a second stream, including a catalyst activator, are combined in a mix head and immediately injected into a mold where, within a matter of seconds, polymerization and molding to a permanently fixed shape take place simultaneously.

In the presence of a metathesis catalyst system, polymerization takes place extremely rapidly even at low temperatures. In fact, polymerization occurs so rapidly that it is not unusual for the monomer to polymerize to a solid, immobile condition before the mixed streams can be transferred to the mold. To overcome this difficulty, Klosiewicz teaches the inclusion of a reaction rate moderator in the activator stream to delay the catalyst activation until the reaction mass is totally within the mold. The total time from mixing until polymerization is substantially complete is still just a matter of seconds.

In the typical system, according to Klosiewicz, the catalyst component is a tungsten or molybdenum halide and the activator is an alkyl aluminum compound. The reaction rate moderator can be an ester, ether, ketone or nitrile.

Due to the extremely rapid rate of reaction of strained ring polycyclic cycloolefins, even in the presence of the rate-moderated catalyst, useful polymerization has heretofore been accomplished almost exclusively by the reaction injection molding (RIM) process using the two-stream process of Klosiewicz. Even in RIM processes, the short gelation times limit the application to relatively small items and to relatively nondetailed molds with a minimum of sharp corners or "kiss-off" sections which tend to trap pockets of air if the mold is filled too rapidly or if the viscosity of the polymerization mass builds up so rapidly that the gelled monomer does not flow easily into corners or around blockedout sections. The polymerization mass cannot readily be employed in other tnermoset molding techniques such as pour, rotational and resin transfer (RTM) molding applications which require relatively long mold filling times.

It has been found possible (see Leach U.S. Pat. No. 4,458,037) to extend the gelation time to as much as ten minutes at room temperature by use of a dialkyl aluminum iodide activator moderated by an ether. When heated to 80° C. this mixture polymerizes in about 15 seconds. This system is also unsatisfactory in procedures where filling of the mold takes place slowly since the mold temperature must be held low enough during the filling operation that the reaction mixture remains fluid until the mold is entirely filled and then raised to the reaction temperature. For commercially practical production rates to be attained, the differential between mold filling temperature and polymerization reaction temperature must be smaller than is possible using the catalyst of Leach.

It is the object of this invention to provide polymerization feedstreams having substantially increased gelation times at normal molding temperatures compared with such mixtures heretofore known.

In accordance with this invention, it has been found that the onset of gelation or viscosity build-up of metatnesis polymerizable polycyclic cycloolefins at temperatures up to at least about 80° C. can be significantly delayed by employing a bidentate Lewis base as a reaction rate moderator.

A bidentate Lewis base, as the term is employed herein, is an organic compound having one functional group which is chemically reactive with aluminum and a second functional group containing an atom having unpaired electrons whereby it can form an adduct with aluminum. Preferred bidentate Lewis bases are those having the two functional groups in 1,3-relationship. Typical 1,3-bidentate Lewis bases include materials of the general formula:

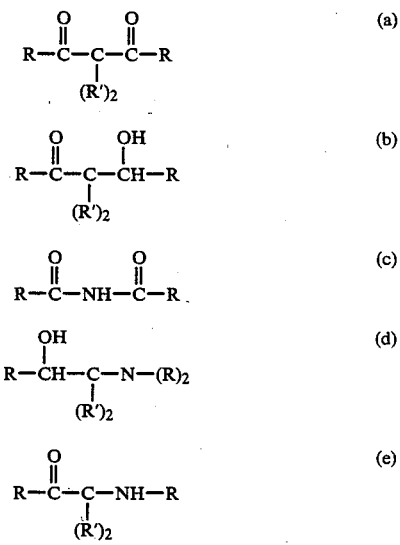

Where R is a 1 to 5 carbon alxyl radical or a phenyl or benzyl radical, R' is a 1 to 5 carbon alkyl radical or hydrogen, and in instances where a plurality of R or R' groups are present in a structure, they may be the same or different.

Exemplary compounds of the above description are 4-hydroxypentanone-2, 3-methyl-2,4-pentanedione, acetylacetone, dibenzoyl methane, N,N-dimethylisopropanolamine, N,N-dimethyl acetone amine, diacetonamine, diacetonalcohol, and diacetamide. Other useful bidentate Lewis bases are tetrahydrofurfuryl alcohol and 8-hydroxyquinoline wherein the two reactive groups are present in a ring structure.

The bidentate activator complexes can be prepared by disproportionation of the corresponding aluminum trichelate with an aluminum alkyl or aluminum alkyl halide according to the reaction:

Al(acetylacetonate)$_3$ + 2R$_3$Al → 3R$_2$Al (acetylacetonate)

The activator complex can also be prepared by reacting the bidentate Lewis base with an aluminum trialkyl or a dialkyl aluminum halide according to the reaction:

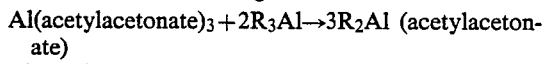

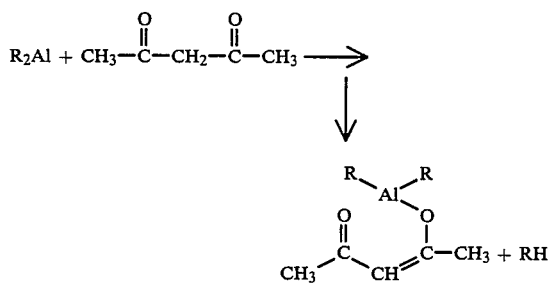

The other bidentate Lewis base species are believed to complex aluminum in a similar manner.

The bidentate Lewis base compounds can be employed in conjunction with conventional metathesis catalysts to polymerize any metathesis polymerizable polycyclic olefin. Most strained ring nonconjugated polycyclic cycloolefins are metathesis polymerizable. These include, for example, dicyclopentadiene, methyl dicyclopentadiene, dicyclopentadiene oligomers, e.g., tricyclopentadiene, norbornene, norbornadiene, alkylidene norbornenes, dimethanooctanydronaphthalene, dimethanohexahydronaphthalene and substituted derivatives of these compounds. The preferred cyclic olefin monomer is dicyclopentadiene or a mixture of dicyclopentaiene with other strained ring polycyclic cycloolefins in ratios of 1 to 99 mole % of either monomer, preferably about 75 to 99 mole % dicyclopentadiene.

The metathesis catalyst system is comprised of two parts, i.e., a catalyst component and an activator. The catalyst component can be either a molyodenum or a tungsten halide or such a halide having two valences satisfied by oxygen rather than halogen. The preferred catalyst component is a tungsten halide, and preferably a mixture or complex of tungsten hexachloride (WCl$_6$) and tungsten oxytetrachloride (WOCl$_4$) in a molar ratio of WOCl$_4$ to WCl$_6$ of about 1:9 to 2:1. This mixture or complex is prepared by contacting essentially pure WCl$_6$ with a controlled portion of an oxygen donor. Useful oxygen donors include, e.g., a hydrated salt, water, a wet molecular sieve and alkyl alcohols. The most preferred oxygen donor is t-butanol. Complete details of the catalyst preparation can be found in Klosiewicz, U.S. Pat. No. 4,568,660.

The tungsten or molyodenum compound is not normally soluble in the monomer, but can be solubilized by complexing it with a phenolic compound. The compound is first suspended in a small amount of an inert diluent such as benzene, toluene, xylene or chlorinated benzene to form a 0.1 to 1 mole per liter slurry. The phenolic compound is added to the slurry in a molar ratio of about 1:1 to 1:3 catalyst compound to phenolic compound and a stream of dry inert gas is passed through the agitated solution to remove hydrogen chloride gas. Preferred phenolic compounds include phenol, alkyl phenols, halogenated phenols or phenolic salts such as lithium or sodium phenoxide. The most preferred phenolic compounds are t-butyl phenol, t-octyl phenol and nonyl phenol.

To prevent premature polymerization of the catalyst component/monomer solution, which would occur within a matter of hours, about 1 to 5 moles of a Lewis base or a chelating agent are added per mole of catalyst compound. Preferred chelants include acetylacetones, dibenzoyl methane and alkyl acetoacetates, where the alkyl group contains from 1 to 10 carbon atoms. Preferred Lewis oases are nitriles and ethers such as benzonitrile and tetrahydrofuran. The improvement in stability and shelf-life of the catalyst component/monomer solution is obtained whether the complexing agent is added before or after the phenolic compound. When this complexed catalyst component is added to purified cycloolefin, for example dicyclopentadiene, it forms a solution which is stable and has a shelf-life of several months in the absence of an activator. The second part of the metathesis catalyst system is the activator, which is an alkyl aluminum or an alkyl tin compound, moderated with the bidentate Lewis base. The alkyl aluminum compounds, either trialkyl aluminum or dialkyl aluminum halide, are preferred. Particularly preferred is a dialkyl aluminum halide with an alkyl moiety containing 1 to 12 carbon atoms and iodide as the halide. The activator is readily soluble in the monomer. The activator is prepared by mixing the alkyl aluminum compound or mixture of alkyl aluminum compounds with the bidentate Lewis base or mixture of bidentate Lewis bases at a 1:1 to 1:5 molar ratio. While either order of addition, i.e., Lewis base to alkyl aluminum compound or alkyl aluminum compound to Lewis base, can be used, it is preferred to add the Lewis base to the alkyl aluminum compound with agitation. The reaction is highly exothermic, and it is desirable to control the rate of Lewis base addition to the alkyl aluminum compound so as to maintain the temperature at less than approximately 50° C. to prevent decomposition of the aluminum Lewis base complex. In the case of solid bidentate Lewis bases, the base can be added as the solid or dissolved in a suitable nonreactive solvent such as toluene. The activator can also be prepared by dissolving or suspending the bidentate Lewis base in the monomer and adding the alkyl aluminum component.

When the two parts of the catalyst system are combined, the resulting monomer (for example dicyclopentadiene) to catalyst compound ratio will be from about 500:1 to about 15,000:1 on a molar basis, preferably 2,000:1 and the catalyst compound to alkyl aluminum ratio will be from about 1:2 to about 1:5.

A reaction mixture moderated by a bidentate Lewis base according to this invention remains fluid for a relatively long time at room temperature prior to forming a gel. As long a time as 1 to 4 hours can be required for gel formation at room temperature. Thus, the catalyst components need not be mixed and immediately injected into a mold. While the RIM technique can be employed, processing is not limited to the RIM technique. Moreover, the RIM technique can be used with a premixed reactive solution (i.e., monomer containing both catalyst and activator) and materials can be charged directly into the heated mold without using a mix head on the molding machine.

The great advantage of using the moderators of this invention results from the extended gel time that they provide at convenient molding temperatures, i.e., about 80° C. At 80° C., the gel time can be extended to as long as three minutes and more; whereas solutions containing conventional rate moderators usually gel within a maximum of 15 to 20 seconds. This extended gel time, during which the reaction mixture remains highly fluid, allows the reaction mixture to be used in techniques where molds are filled slowly. For example, the mixture can be employed in rotational molding where centrifugal force is employed to distribute the mixture and where the polymerization reaction must be delayed until uniform distribution is achieved. The mixtures are also useful in preparing polymer articles filled with glass or other fibrous mat reinforcement where the mixture must remain fluid until it has completely impregnated the mat. Manufacture of large objects, where the volume of the mold, per se, necessitates long filling time, can also be facilitated by using the bidentate Lewis base moderators of this invention. Using the moderators described in this invention, molds can be charged at the polymerization temperature in most cases.

In the known processes, where RIM processing is usually contemplated, combining of the components is most conveniently accomplished by mixing equal parts of two solutions, one of which contains twice the desired concentration of catalyst component, and the other of which contains twice the desired concentration of activator. This is possible, but not necessary, when the rate moderators contemplated herein are employed. Since the reactive mixture does not gel immediately, it is frequently convenient to add one part of the system to substantially all of the monomer and, just prior to the polymerization and molding, add a concentrate of the other part.

The invention is illustrated by the following examples. In these examples, the catalyst component was prepared by suspending a $WCl_6/WOCl_4$ complex in toluene, reacting it with nonylpnenol to solubilize it and complexing it with acetylacetone. This product was then diluted to a 0.1 molar concentration by adding sufficient additional toluene. A 1.0 molar toluene solution of an 85:15 molar mixture of tri-n-octyl aluminum (TNOA) and dioctyl aluminum iodide (DOAI) was prepared. One equivalent of bis(methoxyethyl) ether (diglyme) per mole of combined TNOA and DOAI was added to form a standard, control activator for dicyclopentadiene polymerization.

Control Example

To a nitrogen-sparged vessel was charged 5 volumes of dicyclopentadiene. To this was added 0.06 volume of the standard 85:15 TNOA/DOAI mixture, and the mass was mixed well. After the mixing, 0.2 volume of the 0.1M tungsten catalyst component solution was injected and mixed well. The vessel was immersed in a constant temperature bath maintained at 80° C.

The same procedure was simultaneously carried out using a 1.0M TNOA solution free of DOAI as the activator.

The time from addition of the tungsten catalyst component until formation of a non-fluid gel was noted and recorded as the gel time. Similarly the time from addition of the catalyst until the temperature reached one-half of the final exotherm temperature was noted and recorded as the induction time or cure time. For these control examples, these values are recorded in Table I.

EXAMPLES 1 to 9

The procedure used to test the control or standard activators was followed using similar molar quantities of various bidentate Lewis base as the moderator in place of diglyme. Moderators tested and the gel and cure times achieved therewith are recorded in Table I.

TABLE I

| Example No. | Activator | Moderator | Gel Time (sec.) | Cure Time (sec.) |
|---|---|---|---|---|
| Control | TNOA/DOAI | diglyme | 15 | 22 |
| Control | TNOA | diglyme | 3 | 15 |
| 1 | DOAI | dibenzoylmethane | 135 | 191 |
| 2 | DOAI | dibenzoylmethane* | 105 | 154 |
| 3 | DOAI | acetylacetone | 140 | 210 |
| 4 | DOAI | acetylacetone** | 103 | 139 |
| 5 | DOAI | HFA*** | 146 | 292 |
| 6 | DOAI | 8-hydroxy-quinoline**** | 225 | 260 |
| 7 | TNOA | THFA | 78 | 123 |
| 8 | TNOA/DOAI | acetyl acetone | 115 | 156 |
| 9 | TNOA/DOAI | dibenzoyl methane | 136 | 205 |

*In form of Al(DBM)3.[1]
**In form of Al(AcAc)3.[1]
***Hexafluoroacetylacetone.
****In form of Al(HQ)3.[1]
THFA = tetrahydrofurfuryl alcohol
HQ = 8-hydroxylquinoline
[1]These complexes were prepared by reacting one equivalent of TNOA with three equivalents of the bifunctional Lewis base moderator.

The data from Examples 1 through 9 clearly show the significant increase in gel and cure times of the dicyclopentadiene solutions containing bidentate Lewis base rate moderators.

What is claimed is:

1. A polymerization feed composition comprising:
   (a) a methathesis polymerizable polycyclic cycloolefin selected from the group consisting of dicyclopentadiene, methyl dicyclopentadiene, tricyclopentadiene, norbornene, norbornadiene, alkylidene norbornenes, dimethanooctahydronaphthalene, and dimethanohexahydronaphthalene;
   (b) a methathesis polymerization catalyst selected from the group consisting of molybdenum halides, tungsten halides and said halides wherein two valences are oxygen instead of halogen, wherein said catalyst is solubilizied with a phenol compound; and
   (c) a catalyst activator comprising an alkyl aluminum compound and a reaction rate modifier comprising a bidentate Lewis base within said Lewis base has one functional group which is chemically reactive with aluminum and a second functional group which forms an adduct with aluminum.

2. The composition of claim 1 wherein the catalyst activator comprises a dialkyl aluminum halide.

3. The composition of claim 1 wherein the catalyst activator is a mixture of a trialkyl aluminum and a dialkyl aluminum halide wherein the alkyl groups have about 2 to 10 carbon atoms.

4. The composition of claim 2 wherein the dialxyl aluminum halide comprises dialkyl aluminum iodide.

5. The composition of claim 3 wherein the dialkyl aluminum halide comprises dialkyl aluminum iodide.

6. The composition of claim 4 wherein the bidentate Lewis base is tetrahydrofurfuryl alcohol.

7. The composition of claim 4 wherein the bidentate Lewis base is 8-hydroxyquinoline.

8. The composition of claim 4 wherein the bidentate Lewis base is a compound selected from the class of compounds having the formula:

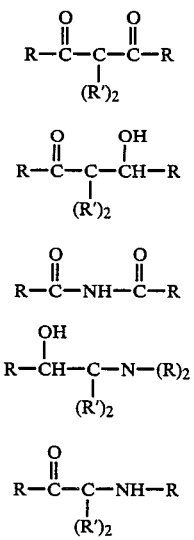

(a)
(b)
(c)
(d)
(e)

Where R is a 1 to 5 carbon alkyl radical or a phenyl or benzyl radical, R' is a 1 to 5 carbon alkyl radical or hydrogen, and in instances where a plurality of R or R' groups are present in a structure, they may be the same or different.

9. The composition of claim 8 wherein the bidentate Lewis base is acetylacetone.

10. The composition of claim 8 wherein the bidentate Lewis base is dibenzoylmethane.

11. The composition of claim 5 wherein the bidentate Lewis base is tetrahydrofurfuryl alcohol.

12. The composition of claim 5 wherein the bidentate Lewis base is 8-hydroxyquinoline.

13. The composition of claim 5 wherein the bidentate Lewis base is a compound selected from the class of compounds having the formula:

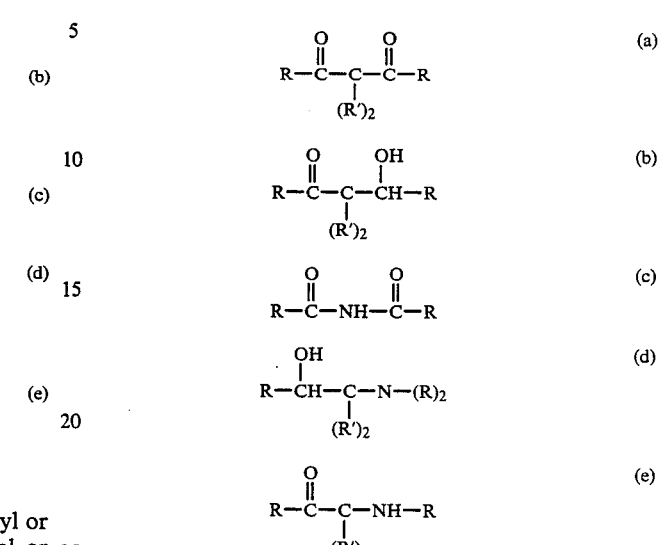

(a)
(b)
(c)
(d)
(e)

where R is a 1 to 5 carbon alkyl radical or a phenyl or benzyl radical, R' is a 1 to 5 carbon alkyl radical or hydrogen, and in instances where a plurality of R or R' groups are present in a structure, they may be the same or different.

14. The composition of claim 13 wherein the bidentate Lewis base is acetylacetone.

15. The composition of claim 13 wherein the bidentate Lewis base is dibenzoylmethane.

* * * * *

UNITED STATES PATENT AND TRADEMARK OFFICE
CERTIFICATE OF CORRECTION

PATENT NO. : 4,897,456
DATED : January 30, 1990
INVENTOR(S) : Lawrence L. Nelson It is certified that error appears in the above-identified patent and that said Letters Patent is hereby corrected as shown below:

Column 1, line 58 " tnermoset "

should read -- thermoset --

Column 3, line 10 in formula " $R_2Al$ "

should read -- $R_3Al$ --

Column 3, line 40 " molyodenum "

should read -- molybdenum --

Column 3, line 54 " molyodenum "

should read -- molybdenum --

Column 6, line 47 " within "

should read -- wherein --

Signed and Sealed this

Eighteenth Day of December, 1990

*Attest:*

HARRY F. MANBECK, JR.

*Attesting Officer*     *Commissioner of Patents and Trademarks*